United States Patent
Kuo et al.

(10) Patent No.: US 8,223,302 B2
(45) Date of Patent: Jul. 17, 2012

(54) DISPLAY PANEL, ELECTRO-OPTICAL APPARATUS, AND METHODS FOR MANUFACTURING THE SAME

(75) Inventors: Yu-Ping Kuo, Taipei County (TW); Shih-Chyuan Fan Jiang, Taipei (TW); Chih-Jen Hu, Taoyuan County (TW)

(73) Assignee: Au Optronics Corporation, Hsinchu (TW)

( * ) Notice: Subject to any disclaimer, the term of this patent is extended or adjusted under 35 U.S.C. 154(b) by 431 days.

(21) Appl. No.: 12/485,918

(22) Filed: Jun. 17, 2009

(65) Prior Publication Data
US 2010/0201927 A1  Aug. 12, 2010

(30) Foreign Application Priority Data
Feb. 10, 2009  (TW) ................. 98104174 A

(51) Int. Cl.
*G02F 1/1335* (2006.01)
*G02F 1/1343* (2006.01)
*G02F 1/1337* (2006.01)

(52) U.S. Cl. ........ 349/114; 349/144; 349/146; 349/130; 349/129

(58) Field of Classification Search ................. 349/114, 349/144, 146, 130, 126, 129
See application file for complete search history.

(56) References Cited

U.S. PATENT DOCUMENTS

| | | | |
|---|---|---|---|
| 6,927,817 B2 | 8/2005 | Itoh et al. | |
| 6,999,145 B2 * | 2/2006 | Maeda | 349/114 |
| 7,002,652 B2 | 2/2006 | Wen et al. | |
| 7,119,761 B2 | 10/2006 | Shen et al. | |
| 7,139,052 B2 * | 11/2006 | Maeda | 349/114 |
| 7,274,421 B2 * | 9/2007 | Okumura | 349/130 |
| 7,450,202 B2 * | 11/2008 | Tsuchiya | 349/114 |
| 7,586,575 B2 * | 9/2009 | Higa et al. | 349/144 |
| 7,626,663 B2 * | 12/2009 | Kimura | 349/129 |
| 7,663,716 B2 * | 2/2010 | Tsuchiya | 349/114 |
| 7,907,240 B2 * | 3/2011 | Sawado | 349/114 |
| 8,031,303 B2 * | 10/2011 | Higa | 349/114 |
| 2006/0114380 A1 | 6/2006 | Kurashima | |
| 2008/0151174 A1 * | 6/2008 | Koito et al. | 349/155 |
| 2009/0284693 A1 * | 11/2009 | Adachi et al. | 349/98 |

FOREIGN PATENT DOCUMENTS

| | | | |
|---|---|---|---|
| CN | 101221332 | | 7/2008 |
| CN | 101221332 A | * | 7/2008 |
| CN | 100410746 C | * | 8/2008 |
| CN | 100410746 C | | 8/2008 |

OTHER PUBLICATIONS

"1st Office Action of China counterpart application", issued on Mar. 18, 2010, p. 1-7.

* cited by examiner

*Primary Examiner* — Mike Qi
(74) *Attorney, Agent, or Firm* — Jianq Chyun IP Office

(57) ABSTRACT

A display panel includes a first substrate, a second substrate, signal lines, sub-pixels, and at least one thickness adjusting layer. The second substrate is disposed above the first substrate and has a transparent electrode layer thereon. The signal lines are disposed on the first substrate. The sub-pixels are arranged between the first and second substrates. The sub-pixels are electrically connected with the signal lines, and parts of them have at least one transparent area and at least one reflective area. The transparent area has a transparent electrode therein, and the reflective area has a reflective electrode therein, respectively. The thickness adjusting layer is disposed above the reflective electrode and located at the reflective area of the part of the sub-pixels.

19 Claims, 12 Drawing Sheets

DISPLAY PANEL, ELECTRO-OPTICAL APPARATUS, AND METHODS FOR MANUFACTURING THE SAME

CROSS-REFERENCE TO RELATED APPLICATION

This application claims the priority benefit of Taiwan application serial no. 98104174, filed on Feb. 10, 2009. The entirety of the above-mentioned patent application is hereby incorporated by reference herein and made a part of specification.

BACKGROUND OF THE INVENTION

1. Field of the Invention

The present invention relates to a display panel, an electro-optical apparatus, and methods for manufacturing the same and, more particularly, relates to a display panel having a transflective pixel structure, an electro-optical apparatus, and methods for manufacturing the same.

2. Description of Related Art

Thin film transistor liquid crystal displays (TFT-LCDs) are generally classified into three major types, namely, the transmissive type, the reflective type, and the transflective type. This classification is based on the light sources utilized and the design of the array substrate. Generally, the transmissive TFT-LCD mainly utilizes a backlight as the light source. The pixel electrodes on the TFT array substrate are transparent electrodes for facilitating the transmittance of light from the backlight source. The reflective TFT-LCD mainly employs a front-light or an ambient light (environment light) as the light source. The pixel electrodes on the TFT array substrate are metal electrodes or other reflective electrodes with good reflectivity suitable for reflecting the lights from the front-light source or the ambient light source. On the other hand, the transflective TFT-LCD can be regarded as a structure that integrates both the transmissive TFT-LCD and the reflective TFT-LCD. The transflective TFT-LCD can utilize both a backlight source and a front-light source or an ambient light source simultaneously as the light source to display.

In the conventional transflective multi-domain vertical alignment LCD, the color filter substrate is only disposed with a plurality of alignment protrusions and not with other film layers or devices. Moreover, the alignment protrusions are distributed above the reflective electrode and the transparent electrode on the TFT array substrate. Usually, in the same sub-pixel, a main slit is designed between the reflective electrode and the transparent electrode. That is, a gap is present between the reflective electrode and the transparent electrode, so as to let the reflective electrode and the transparent electrode separating from one another with the goal of tilting the LC molecules, which locate at the edges of the transparent electrode and the reflective electrode, toward the alignment protrusions. It should be illustrated that the entire edge of the transparent electrode and that of the adjacent reflective electrode within the same sub-pixel do not have a connection part, so a gap is present between the transparent electrode and the adjacent reflective electrode. In other words, the shapes of the transparent electrode and the reflective electrode within the same sub-pixel correspond to the shapes of the areas T and R. Thus, a gap is present between the entire edges of the adjacent transparent electrode and the adjacent reflective electrode, and also the entire edges of the reflective electrode and the adjacent transparent electrode. Being disposed between the reflective electrode and the transparent electrode, the main slits can alter the electric field distribution, so as to tilt the LC molecules toward the alignment protrusions for achieving the wide viewing angle effect. Moreover, a connection electrode is also present between the reflective electrode and the transparent electrode within the same sub-pixel. The connection electrode merely shields or locates at a slight part, which is approximately less than 10%, of the main slits to electrically connect the reflective electrode with the transparent electrode. The connection electrode can be of the same electrode material as the reflective electrode or the transparent electrode. At this time, a gap is still present between the reflective electrode and the adjacent transparent electrode within the same sub-pixel. In addition, in two adjacent sub-pixels, a gap or a space is present between the transparent electrode of one sub-pixel and the reflective electrode of another sub-pixel, so that the electrodes aforementioned are separated.

In the transflective multi-domain vertical alignment LCD, the design of the main slits between the reflective electrode and transparent electrode and the alignment protrusions correspondingly disposed above the transparent electrode can alter the electric field in the neighboring LC layer. Thus, the LC molecules are not tilting toward the expected alignment direction. However, the presence of the main slits and the alignment protrusions correspondingly disposed above the transparent electrodes also results in loss in the LCD aperture ratio.

SUMMARY OF THE INVENTION

The present invention provides a display panel for solving the problem of loss in LCD aperture ratio due to the presence of main slits and alignment protrusions in traditional transflective multi-domain vertical alignment LCDs.

The present invention further provides a method of manufacturing a display panel for producing the display panel aforementioned.

The present invention further provides an electro-optical apparatus including the aforesaid display panel.

The present invention further provides a method of manufacturing the aforesaid electro-optical apparatus.

The present invention provides a display panel, which includes a first substrate, a second substrate, a plurality of signal lines, a plurality of sub-pixels, at least one thickness adjusting layer, and an LC layer. The second substrate is disposed above the first substrate and has a transparent electrode layer thereon. The signal lines are disposed on the first substrate. The sub-pixels are arranged between the first substrate and the second substrate. The sub-pixels are electrically connected to the signal lines, and parts of the sub-pixels have at least one transparent area and at least one reflective area. The transparent area has a transparent electrode therein and the reflective area has a reflective electrode therein. The edge of the transparent electrode and the edge of the reflective electrode at a connection part of the transparent electrode and the reflective electrode are covered entirely to form a pixel electrode. The thickness adjusting layer is disposed above the reflective electrode and located within the reflective area of the part of the sub-pixels. The LC layer is disposed between the first substrate and the second substrate.

The present invention provides a method of manufacturing a display panel. Firstly, a first substrate and a second substrate are provided. The second substrate is disposed above the first substrate and has a transparent electrode layer thereon. Next, a plurality of signal lines is disposed on the first substrate, and a plurality of sub-pixels is arranged between the first substrate and the second substrate. The sub-pixels are electrically connected to the signal lines, and parts of the sub-pixels have at least one transparent area and at least one reflective area. The transparent area has a transparent electrode therein and the reflective area has a reflective electrode therein. The edge of the transparent electrode and the edge of the reflective electrode at a connection part of the transparent electrode and the reflective electrode are covered entirely to form a pixel electrode. At least one thickness adjusting layer is disposed above the reflective electrode and located within the reflective area of the part of the sub-pixels. Thereafter, an LC layer is disposed between the first substrate and the second substrate.

The present invention provides a method of manufacturing an electro-optical apparatus, and the method includes the method of manufacturing the display panel as described above.

The present invention further provides an electro-optical apparatus including the aforesaid display panel.

In light of the foregoing, in the sub-pixels applied in the display panel of the present invention, the edge of the transparent electrode and the edge of the reflective electrode at the connection part of the transparent electrode and the reflective electrode are entirely covered. Therefore, the connection part does not have the main slits. Consequently, the present invention has a higher aperture ratio in comparison to those of the conventional display panels. Moreover, the thickness adjusting layer of the present invention is located above the reflective electrode or located above the reflective electrode and extends to the edge of a part of the transparent electrode, which is adjacent to the reflective electrode in the same sub-pixel. The thickness adjusting layer also has the function of having alignment patterns. Hence, the present invention does not require the disposition of the alignment patterns (such as alignment protrusions) on the second substrate. As a result, the aperture ratio of the display panel can be increased.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
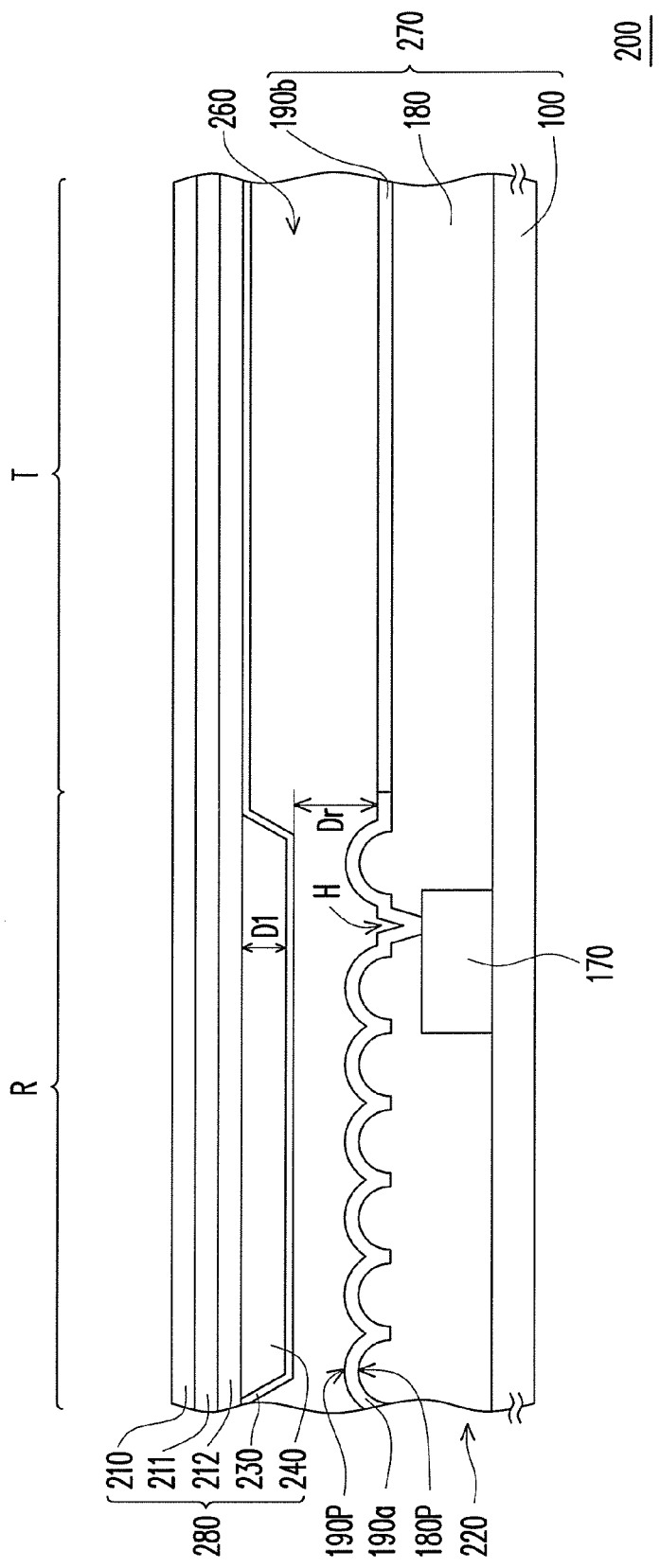
FIG. 1 is a schematic cross-sectional view of a display panel according to an embodiment of the present invention.
Figure 2:
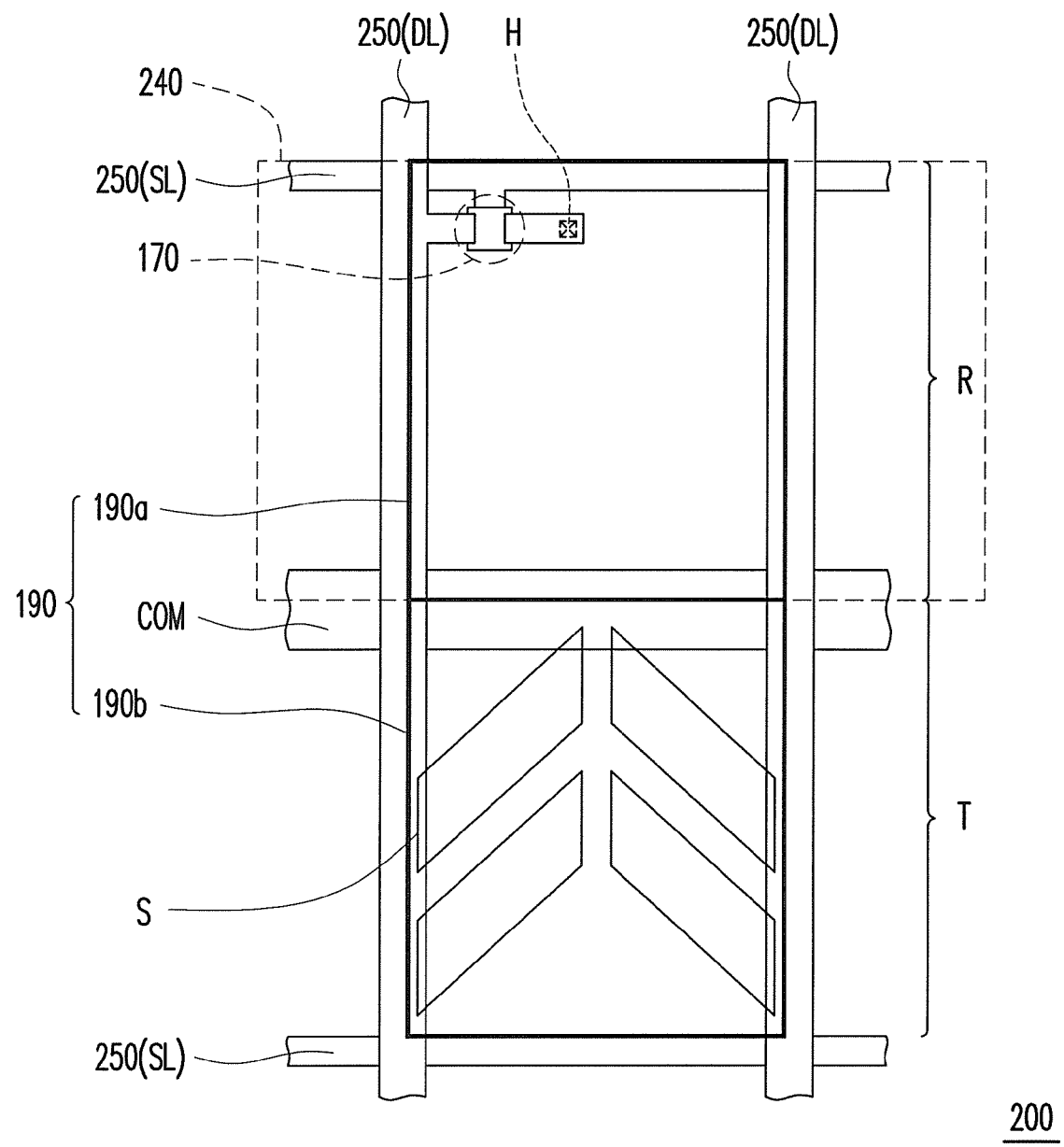
FIG. 2 is a schematic top view of a pixel array substrate in a display panel according to an embodiment of the present invention.

FIG. 1 is a schematic cross-sectional view of a display panel which is assembled by a pixel array substrate and a corresponding color filter substrate according to an embodiment of the present invention. FIG. 2 is a schematic top view of a sub-pixel unit in the pixel array substrate in FIG. 1. Referring to FIG. 1 and FIG. 2 simultaneously, a display panel 200 in the present embodiment is mainly assembled by a pixel array substrate 270, a color filter substrate 280 which is located opposite to the pixel array substrate 270, and an LC layer 260 which is located between the color filter substrate 280 and the pixel array substrate 270.

In detail, the pixel array substrate 270 includes a substrate 100, a plurality of signal lines 250, a plurality of common electrode lines COM, and a plurality of sub-pixels 220 comprising a plurality of active devices 170. The signal lines 250 are disposed on the substrate 100, and are data lines DL or scan lines SL, for example. The sub-pixels 220 are arranged between the substrate 100 and the color filter substrate 280, and connected to the signal lines 250.

In the present embodiment, the material of the substrate 100 includes inorganic transparent material (i.e. glass, quartz, other suitable materials, or a combination thereof), organic transparent material (i.e. polyalkene, polyalcohol, polyester, rubber, thermoplastic polymer, thermosetting polymer, polyaromatic, polymethylmethacrylate, polycarbonate, other suitable materials, derivatives thereof, or a combination thereof), inorganic opaque material (i.e. silica sheet, ceramic, other suitable materials, or a combination thereof), or a combination thereof.

The active device 170 is electrically connected to the signal lines 250. In the present embodiment, the active device 170 can be a top-gate TFT, a bottom-gate TFT, or other suitable TFTs.

Moreover, a protection layer 180 is formed on the active device 170 and has a contact opening H which exposes the active device 170. Preferably, a plurality of protrusion patterns (such as bumps) 180P are formed on parts of surface of the protection layer 180, but the present embodiment is not limited thereto. In other embodiments, the protrusion patterns 180P may not be formed on surface of the protection layer 180. Thereafter, structures similar to the protrusion patterns 180P can be generated by each film layer when manufacturing the pixel array substrate 270. The protrusion patterns 180P on the protection layer 180 in a reflective area R described in the present embodiment is used as an exemplification to illustrate in further detail. On the other hand, the protection layer 180 in a transparent area T does not have the design of the protrusion patterns 180P. Through the protection of the protection layer 180, the active device 170 is prevented from moisture invasion that affects device characteristics. In the present embodiment, the protection layer 180 can be a single layer or a multi-layer structure, and the material thereof is organic material (i.e. photoresist, benzocyclobutene, cycloalkene, polyimide, polyamide, polyester, polyalcohol, polyethylene oxide, polyphenylene, resin, polyether, polyketone, or other suitable materials), inorganic materials (i.e. silicon oxide, silicon nitride, silicon oxynitride, other suitable materials, or a combination thereof), or a combination thereof.

Referring to FIG. 1, in the present embodiment, the sub-pixel 220 has at least one transparent area T and at least one reflective area R. That is, the transparent area T and the reflective area R are located in the same sub-pixel to form one sub-pixel 220. The transparent area T has a transparent electrode 190b therein, and the reflective area R has a reflective electrode 190a therein. The edge of the transparent electrode 190b and the edge of the reflective electrode 190a located at the connection part of the transparent electrode 190b and the reflective electrode 190a are entirely covered in the same sub-pixel to form a pixel electrode 190. As a consequence, the sub-pixel structure of the present embodiment becomes a transflective sub-pixel structure. It should be noted that the edges of the transparent electrode and the reflective electrode are entirely covered in the same sub-pixel represents that the entire edge of the transparent electrode covers the entire edge of the reflective electrode in the same sub-pixel, or the entire edge of the reflective electrode covers the entire edge of the transparent electrode in the same sub-pixel. If the manufacturing condition (i.e. the photolithographic and etching process) is well controlled, the entire edge of the transparent electrode then contacts the entire edge of the reflective electrode completely in the same sub-pixel. As a result, no gap is present between the electrodes (transparent electrode and reflective electrode) in the same sub-pixel. In other words, shapes of the transparent electrode and the reflective electrode correspond to shapes of the areas T and R in the same sub-pixel. The width of the transparent electrode and the width of the reflective electrode are contacted completely or covered entirely in the same sub-pixel. Moreover, although the protrusion patterns (such as bumps) 180P on the protection layer 180 in the reflective area R are illustrated as an exemplification in the present embodiment, the present invention is not limited thereto. Therefore, after the reflective electrode 190a has been formed, the surface thereof includes a plurality of reflective protrusions (such as bumps) 190P. Moreover, the reflective electrode 190a contacts the active device 170 through the contact opening H.

In detail, gaps are not present between the transparent electrode 190b and the reflective electrode 190a of the pixel electrode 190 within the same sub-pixel. Also, according to the differences in the manufacturing process, the connection part of the transparent electrode 190b and the reflective electrode 190a may be partially overlapped in the same sub-pixel. For example, the reflective electrode 190a is on the top and overlaps with a part of the transparent electrode 190b on the bottom in the same sub-pixel. Similarly, the transparent electrode 190b can be on the top and overlaps with a part of the reflective electrode 190a on the bottom in the same sub-pixel. In addition, in two adjacent different sub-pixels, a gap is present between the transparent electrode of one sub-pixel and the reflective electrode of the other sub-pixel, so that the electrodes aforementioned are not connected or are separated. For instance, the transparent electrode of the last sub-pixel and the reflective electrode of the next sub-pixel are not connected. Similarly, the transparent electrode of the next sub-pixel (such as the nth sub-pixel) and the reflective electrode of the bis next sub-pixel (such as the (n+1)th sub-pixel) are not connected. Moreover, a part of the common electrode line COM is located at the connection part of the transparent area T and the reflective area R, but the present invention is not limited thereto. That is, the common electrode line COM can be optionally applied or not applied based on the demand of design.

In the present embodiment, the material of the reflective electrode 190a can be aluminum, aluminum alloy, silver, or other metals with high reflectivity. Here, the material can be a single layer or a multi-layer structure. The transparent electrode 190b can be a single layer or a multi-layer structure. In addition, the material thereof can be fabricated with transparent conductive material, for example, indium tin oxide (ITO), indium zinc oxide (IZO), indium tin zinc oxide (ITZO), hafnium oxide, zinc oxide, aluminum oxide, aluminum tin oxide, aluminum zinc oxide, cadmium tin oxide, cadmium zinc oxide, or a combination thereof.

As illustrated in FIG. 2, in one embodiment, the transparent electrode 190b has a plurality of alignment slits S for arranging the LC molecules in many directions. For instance, the transparent electrodes 190b each includes a plurality of stripe electrode patterns. The alignment slits S are formed between the stripe electrode patterns. The alignment slits S are used to control the arranging direction of the LC molecules in the LCD.

Generally, the extending direction of the alignment slits S and the extending direction of the common electrode line COM in every alignment area all have the same included angle. Therefore, the same displaying effect and displaying angles of similar scopes can be obtained in every observing direction. More particularly, in the design of the display panel 200, the extending direction of the alignment slits S can be adjusted so as to tilt the LC molecules toward these specific directions for obtaining a larger viewing angle in these directions. In addition, the extending direction and the number of the alignment slits S, and the included angle with the extending direction of the common electrode line COM do not limit the present invention.

Referring to FIG. 1, the color filter substrate 280 includes a substrate 210, a color filter matrix (only a color filter layer 211 is shown in the figure as an example), a transparent electrode layer 230, and at least a thickness adjusting layer 240. Especially, the substrate 210 of the present embodiment is not disposed with the conventional alignment patterns (such as alignment protrusions) thereon. In other words, no alignment protrusions are distributed above the reflective electrode 190a and the transparent electrode 190b. Preferably, the color filter substrate 280 further includes a planar layer 212, which covers the color filter layer 211. Moreover, the transparent electrode layer 230 conformally covers the thickness adjusting layer 240 and a part of the planar layer 212. In other embodiments, if the consideration of films profile difference is unnecessary, then the planar layer 212 is not required.

In the present embodiment, the material of the substrate 210 includes inorganic transparent material (i.e. glass, quartz, other suitable materials, or a combination thereof), organic transparent material (i.e. polyalkene, polyalcohol, polyester, rubber, thermoplastic polymer, thermosetting polymer, polyaromatic, polymethylmethacrylate, polycarbonate, other suitable materials, derivatives thereof, or a combination thereof), inorganic opaque material (i.e. silica sheet, ceramic, other suitable materials, or a combination thereof), or a combination thereof.

The color filter layer 211 is assembled by, for example, a plurality of red filter patterns (R), a plurality of green filter patterns (G), a plurality of blue filter patterns (B), and light shielding patterns (not shown) located between each sub-pixels. In other embodiments, other color filter patterns on the chromaticity diagram may also be utilized. Moreover, the color filter patterns to be represented at one time may include three, four, five, six, or other suitable numbers to attain a performance with better chroma performance. The formation of the color filter layer 211 is to, for example, form patterned red photoresist layer (not shown), green photoresist layer (not shown), blue photoresist layer (not shown) sequentially in different sub-pixel areas through steps such as the spin coating process and the baking process. Thereafter, the light shielding pattern is formed. On the other hand, the light shielding pattern may be firstly formed, and followed by the formation of the red, green, blue photoresist layers. Obviously, the color filtering layer 211 can be formed by inkjet printing or other applicable methods in other embodiments.

Furthermore, in other embodiments, the color filter layer 211 can also be formed on the substrate 100. For instance, the color filter layer 211 is disposed between the electrodes 190a, 190b, and a pixel array (not shown). In other words, the color filter layer 211 is directly integrated on the pixel array (color filter on array, COA). Here, the pixel array represents the film layer required to form the active devices 170. Additionally, the color filter layer 211 can also be disposed below the pixel array (not shown). That is, the pixel array is above the color filter layer 211 (array on color filter, AOC). Thus, the color filter layer 211 is disposed between the liquid crystal layer 260 and the substrate 100.

The planar layer 212 can be a single layer or a multi-layer structure, and has the material of polyalcohol, resin, polyester, or other suitable materials. Thereafter, a thickness adjusting layer 240 is disposed above the planar layer 212. The thickness adjusting layer 240 is correspondingly disposed in the reflective area R of the sub-pixel after the substrate structure 100 and 210 have been assembled. In the present embodiment, the thickness adjusting layer 240 can be a single layer or a multi-layer structure, and the material thereof includes photoresist, benzocyclobutene, cycloalkene, polyimide, polyamide, polyester, polyalcohol, polyethylene oxide, polyphenylene, resin, polyether, polyketone, other suitable materials, or a combination thereof.

The transparent electrode layer 230 can be a single layer or a multi-layer structure. In addition, the material thereof can be fabricated with transparent conductive material, for example, ITO, IZO, ITZO, hafnium oxide, zinc oxide, aluminum oxide, aluminum tin oxide, aluminum zinc oxide, cadmium tin oxide, cadmium zinc oxide, or a combination thereof.

Upon completion of the manufacture of the pixel array substrate 270 and color filter substrate 280, the LC material is injected between the two substrates 270 and 280 for forming the LC layer 260 to complete the display panel 200 illustrated in FIG. 1 in the present embodiment.

It should be noted that the thickness adjusting layer 240 is located above the reflective electrode 190a of the reflective area R in the same sub-pixel, or above the reflective electrode 190a and extends to a part of the edge of the transparent electrode 190b that is adjacent to the reflective electrode 190a in the same sub-pixel. The presence of the thickness adjusting layer 240 in the reflective area R causes the electric fields in the reflective area R and the transparent area T to be different. Consequently, the cooperation of the different electric fields and the alignment slits S on the transparent electrode layer 230 of the transparent area T causes the LC molecules in the LC layer 260 can be arranged in many directions to obtain multiple alignment fields.

Figure 3:
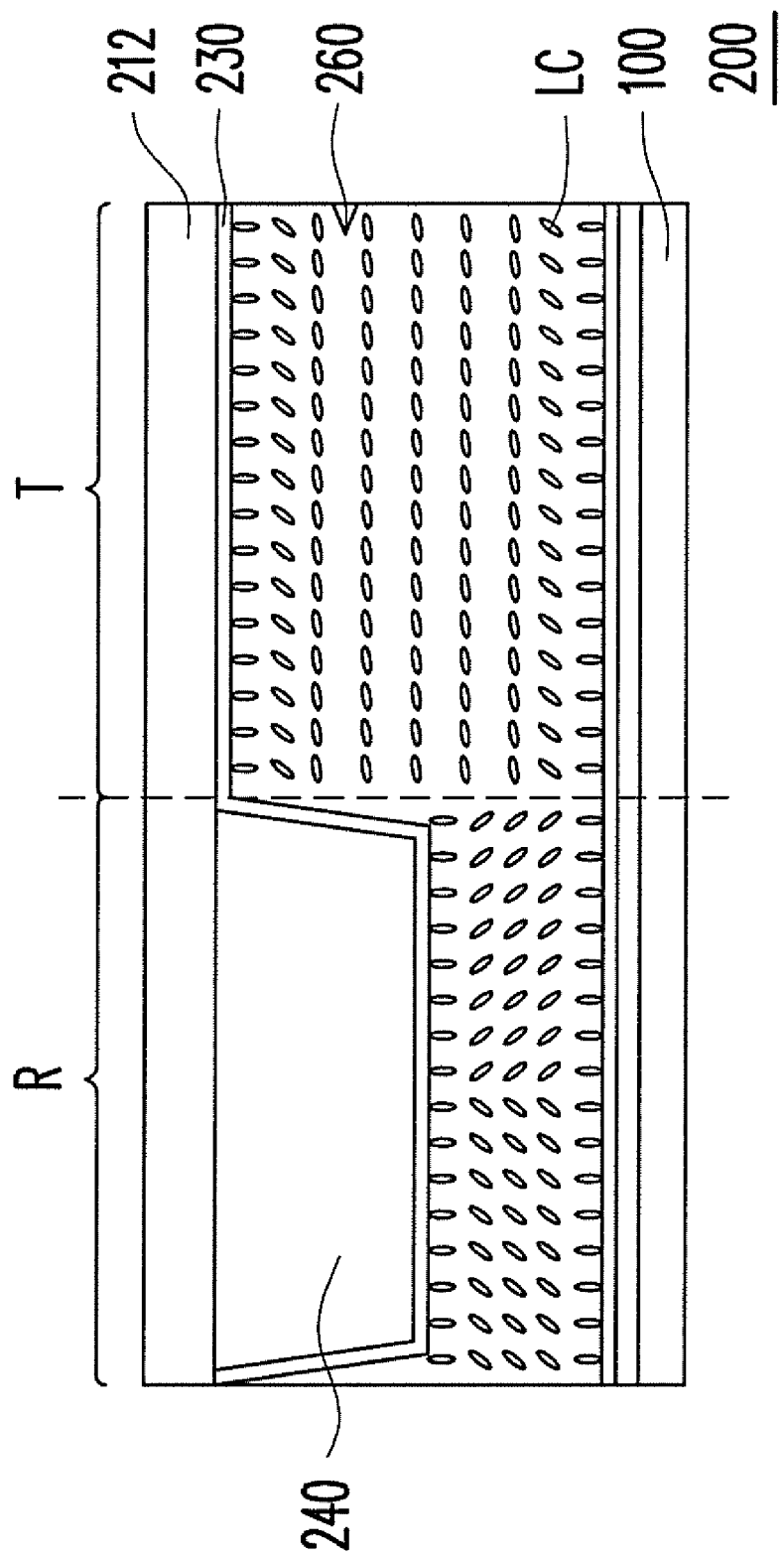
FIG. 3 is a schematic diagram of an alignment of LC molecules in a LC layer of a display panel.

For example, FIG. 3 is a schematic diagram of an alignment of LC molecules in the display panel of FIG. 1. Referring to FIG. 1 and FIG. 3 simultaneously, in the reflective area R, the liquid crystal molecules LC are affected by the thickness adjusting layer 240 and tilt toward the direction of the thickness adjusting layer 240. Therefore, through the thickness adjusting layer 240 disposed above the reflective electrode 190a, a cell-gap between the LC layer 260 in the reflective area R can be changed. Consequently, the transflective display panel of the present embodiment has a dual cell-gap structure. In other words, the transparent area T and the reflective area R each has a LC layer 260 of a different thickness. As shown in FIG. 1, after the thickness adjusting layer 240 having a thickness D1 has been disposed, the LC layer in the reflective area R then has a thickness Dr. Since the surface of the reflective electrode 190a includes the reflective protrusions (such as bumps) 190P, the thickness Dr of the LC layer in the reflective area R can correspond to the thickness of the LC layer at the wave peak of the reflective protrusions 190P, the thickness of the LC layer at the wave trough of the reflective protrusions 190P, or the average of the thickness of the LC layer at the wave peak of the reflective protrusions 190P and the thickness of the LC layer at the wave trough of the reflective protrusions 190P.

Figure 4:
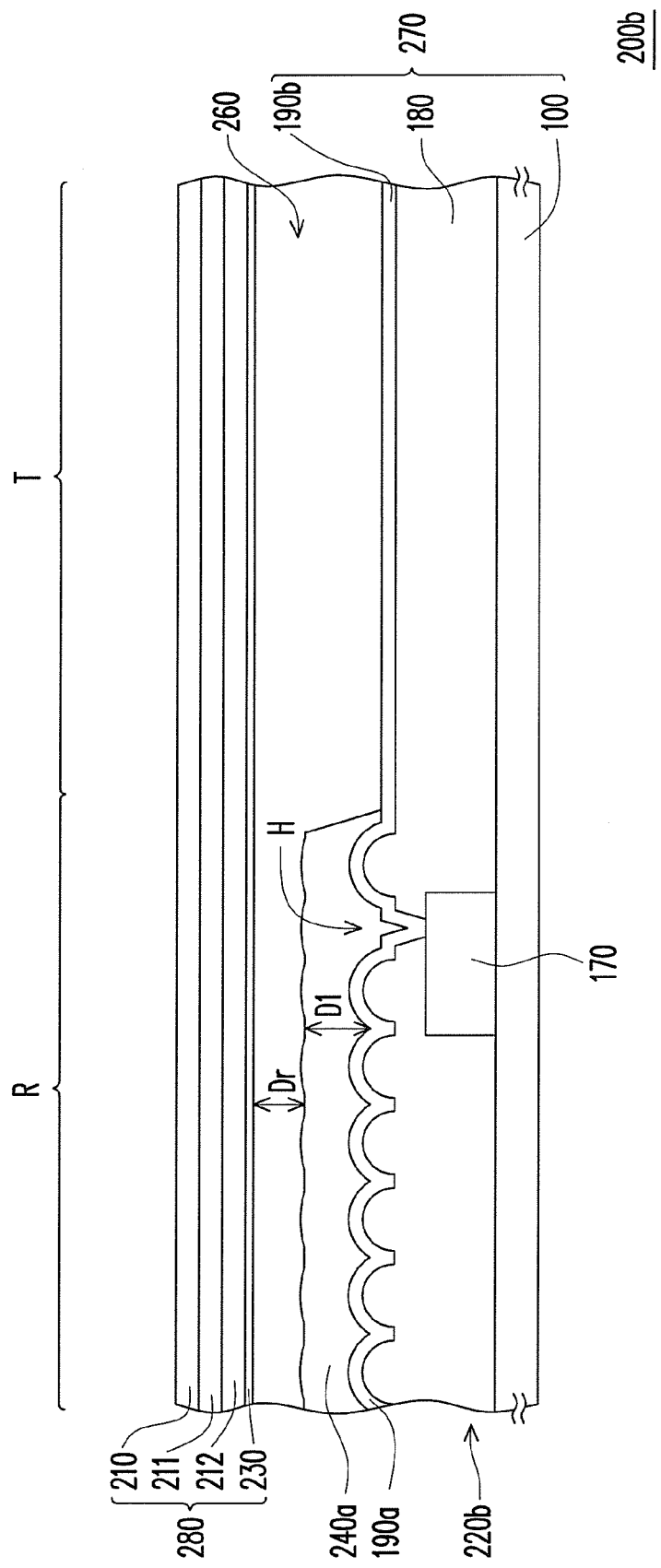
FIG. 4 is a schematic cross-sectional view of a display panel according to another embodiment of the present invention.

FIG. 4 is a schematic cross-sectional view of a sub-pixel of a display panel according to another embodiment of the present invention. A LCD panel 200b of the present embodiment is similar to the LCD panel 200 illustrated in FIG. 1. The main difference between the two is: in the reflective area R of the LCD panel 200b, a thickness adjusting layer 240a is disposed on the substrate 100 instead of on the substrate 210. The thickness adjusting layer 240a, which is disposed on the reflective electrode 190a, is used as an exemplification in the present embodiment. However, the present invention is not limited herein. In other embodiments, the thickness adjusting layer 240a is disposed below the reflective electrode 190a, such that the thickness adjusting layer 240a is not affected by the solutions in the LC layer 260. Moreover, the thickness adjusting layer 240 is located above the reflective electrode 190a of the reflective area R in the same sub-pixel, or above the reflective electrode 190a and extends to a part of the edge of the transparent electrode 190b that is adjacent to the reflective electrode 190a in the same sub-pixel.

In addition, if the thickness adjusting layer 240b is disposed on the reflective electrode 190a, then one embodiment of the color filter layer 211 of the LCD panel 200b is to dispose the color filter layer 211 on the substrate 210.

Figure 5:
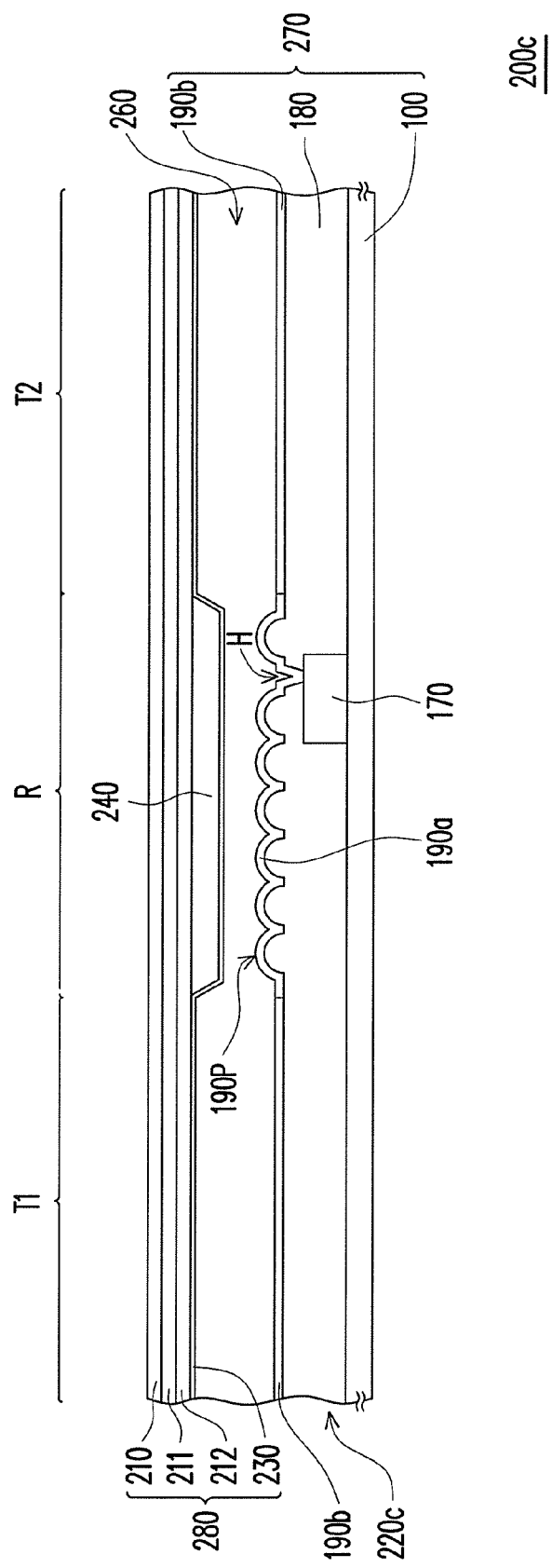
FIG. 5 is a schematic cross-sectional view of a display panel according to another embodiment of the present invention.
Figure 6:
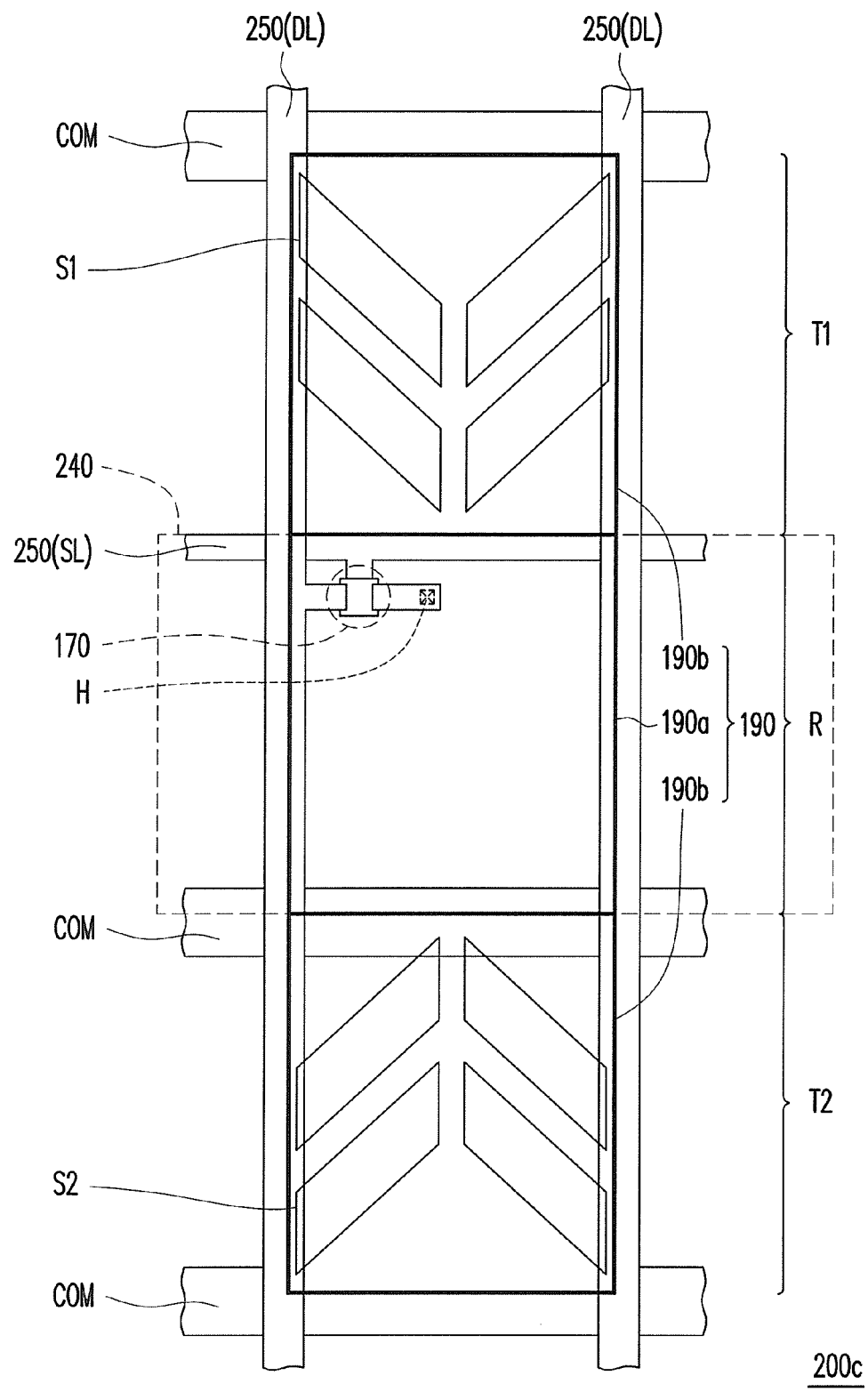
FIG. 6 is a schematic top view of a pixel array substrate in a display panel according to another embodiment of the present invention.

FIG. 5 is a schematic cross-sectional view of a pixel array substrate and a corresponding color filter substrate according to another embodiment of the present invention. FIG. 6 is a schematic top view of a sub-pixel unit in the pixel array substrate in FIG. 5. Referring to FIG. 5 and FIG. 6 simultaneously, a LCD panel 200c of the present embodiment is similar to the LCD panel 200 of the aforementioned embodiment. The main difference between the two is: in the LCD panel 200c, two transparent areas T1, T2 and at least one reflective area R are included in a same sub-pixel 220c. Here, the reflective area R is located between the two transparent areas T1 and T2. Additionally, the edge of the transparent electrode 190b and the edge of the reflective electrode 190a are entirely covered at the connection part of the transparent electrode 190b and the reflective electrode 190a in the same sub-pixel to form a pixel electrode 190. It should be noted that the sub-pixel in FIG. 2 of the above-mentioned embodiment is divided from the signal lines 250. In the present embodiment, FIG. 6 is divided from the signal lines 250(DL), such as data line, and the common electrode line COM.

As illustrated in FIG. 6, in the present embodiment, the transparent electrodes 190b in the two transparent areas T1 and T2 each has a plurality of first alignment slits S1 and a plurality of second alignment slits S2. Herein, the extending direction of the first alignment slits is different from the extending direction of the second alignment slits. In other words, the transparent electrodes 190b each includes a plurality of stripe electrode patterns. The first alignment slits S1 and the second alignment slits S2 are respectively formed between the stripe electrode patterns. The alignment slits S1 and S2 are configured to control the arranging direction of the LC molecules in the LC layer 260 for forming four alignment directions. It must be illustrated that a gap is present between the transparent areas T1 or T2 within two adjacent different sub-pixels. That is, the transparent areas T1 or T2 in the two adjacent different sub-pixels are not connected or are separated from each other.

Figure 7:
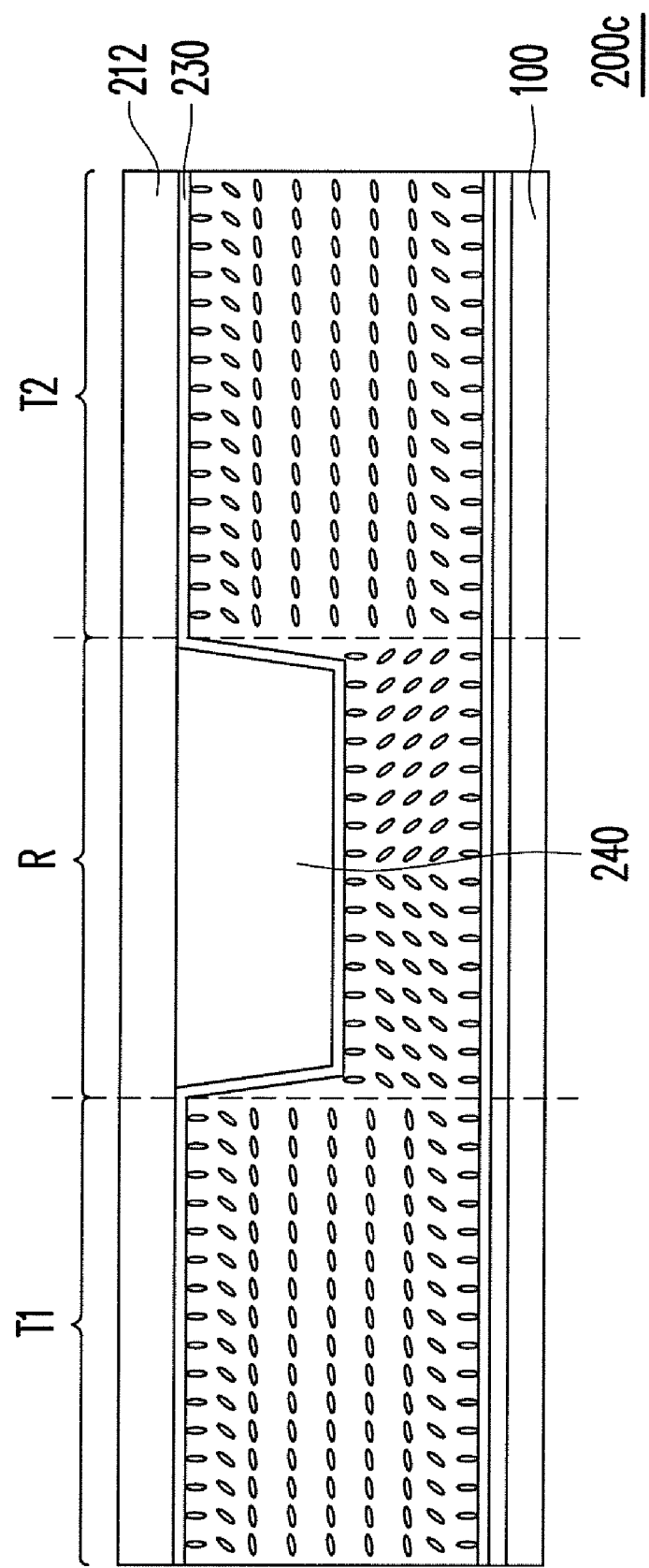
FIG. 7 is a schematic diagram of an alignment of LC molecules in a LC layer of a display panel.

FIG. 7 is a schematic diagram of an alignment of LC molecules in a LC layer of a display panel. Referring to FIG. 5 and FIG. 7 simultaneously, similarly, in the reflective area R, the liquid crystal molecules LC are affected by the thickness adjusting layer 240 and tilt toward the direction of the thickness adjusting layer 240.

Several examples are listed below to illustrate the relationship of the thickness D1 of the thickness adjusting layer of the display panel and the thickness Dr of the LC layer in the reflective area. It should be noted that the data listed in Table 1 to Table 4 respectively correspond to curve diagrams in FIG. 8 to FIG. 11. However, the present invention is not limited to the data listed in Tables 1 to 4. It should be known to those ordinary skilled in the art that various modifications and variations can be made to the parameters or settings of the present invention without departing from the scope or spirit of the invention.

TABLE 1

| D1/Dr | 0.0% | 14.3% | 16.7% | 20.0% | 25.0% | 33.3% |
|---|---|---|---|---|---|---|
| D1 (μm) | 0 | 0.5 | 0.5 | 0.5 | 0.5 | 0.5 |
| Dr (μm) | 3.5 | 3.5 | 3 | 2.5 | 2 | 1.5 |

Figure 8:
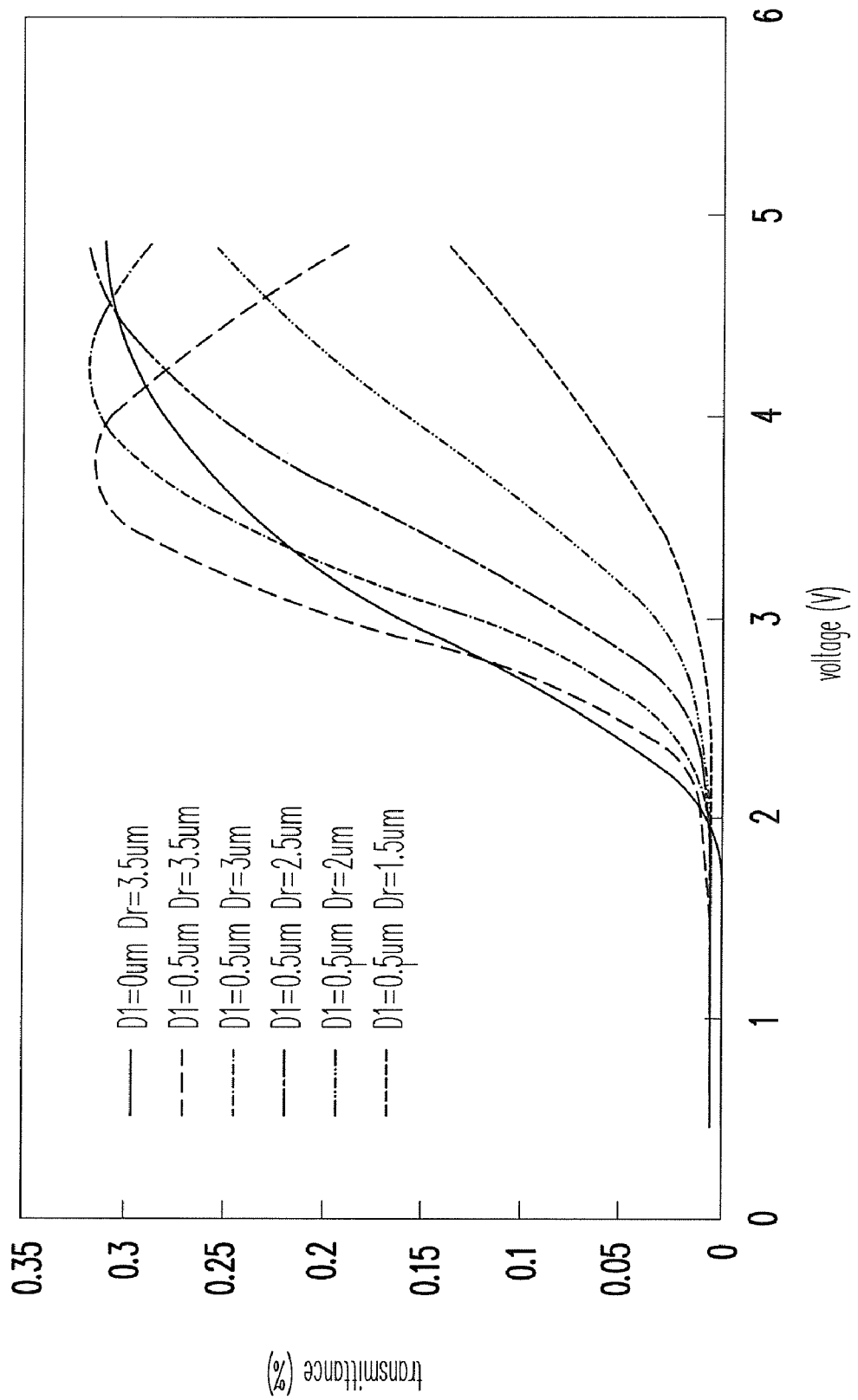
FIGS. 8-11 are respectively curve diagrams of display panel transmittance versus driving voltage measured in a display panel by using the thickness of a thick adjusting layer and the thickness of an LC layer in a reflective area that are listed in Tables 1-4.

In Table 1, D1/Dr represents the ratio of the thickness D1 of the thickness adjusting layer 240 and the cell-gap Dr of the LC layer in the reflective area R. The thickness D1 of the thickness adjusting layer 240 and the cell-gap Dr of the LC layer in the reflective area R are in units of micrometer. FIG. 8 is a curve diagram of the display panel transmittance versus driving voltage measured in the display panel after using the thickness D1 of the thick adjusting layer and the thickness Dr of the LC layer in the reflective area that are listed in Tables 1. As illustrated in FIG. 8 and Table 1, when D1/Dr equals to about 16.7% and about 20.0%, the display panel drives the voltage. For example, when the voltage is close to 5V, the suitable or standard transmittance required by design is still present, such as a transmittance substantially greater than 30%.

Figure 9:
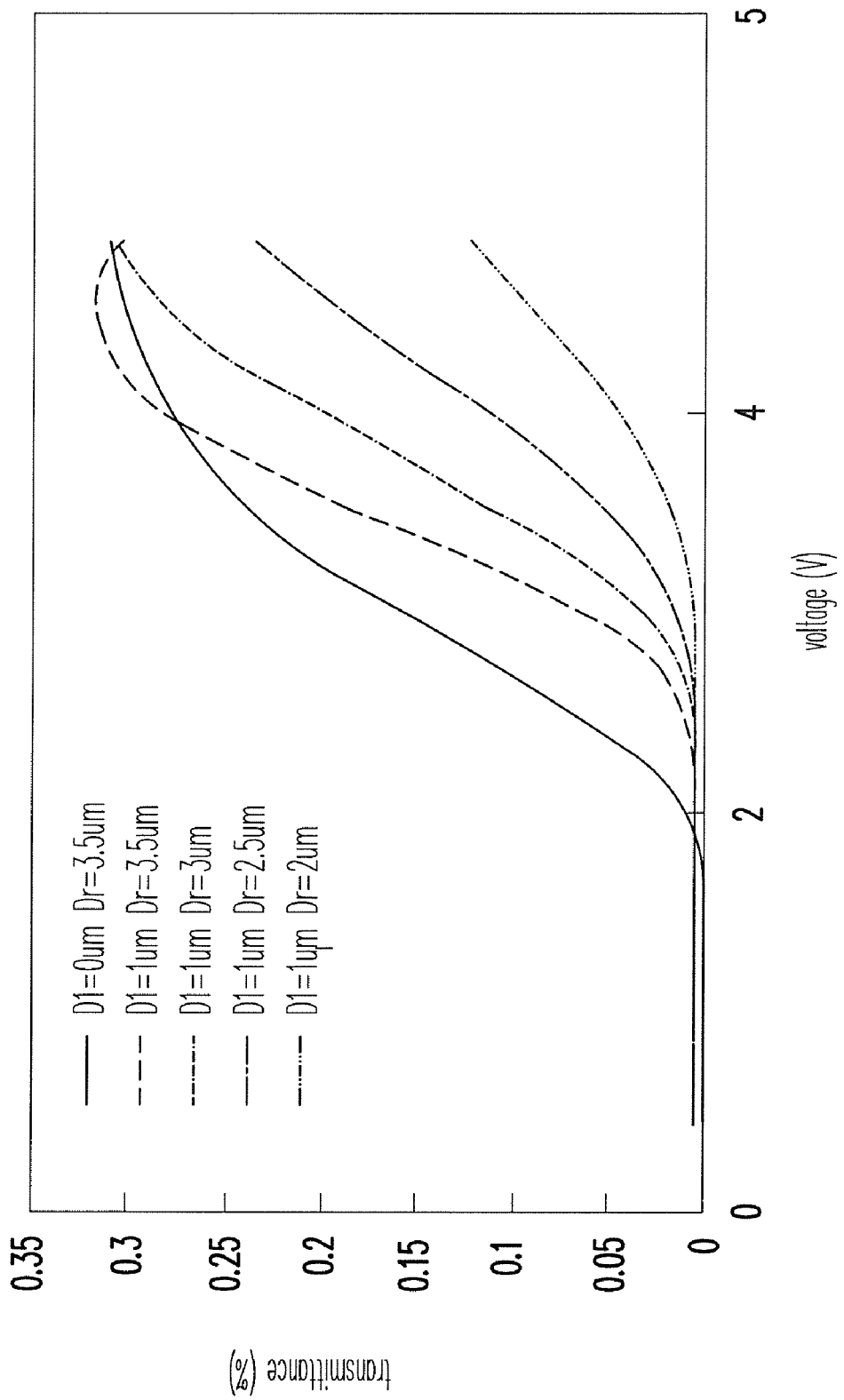

Similarly, FIG. 9 is a curve diagram of the display panel transmittance versus driving voltage measured in the display panel after using the thickness D1 of the thick adjusting layer and the thickness Dr of the LC layer in the reflective area that are listed in Tables 2.

TABLE 2

| D1/Dr | 0.0% | 28.6% | 33.3% | 40.0% | 50.0% |
|---|---|---|---|---|---|
| D1(μm) | 0 | 1 | 1 | 1 | 1 |
| Dr(μm) | 3.5 | 3.5 | 3 | 2.5 | 2 |

As illustrated in FIG. 9 and Table 2, when D1/Dr equals to about 28.6% and about 33.3%, the display panel drives the voltage. For example, when the voltage is close to 5V, the suitable or standard transmittance required by design is still present, such as a transmittance substantially greater than 30%.

Figure 10:
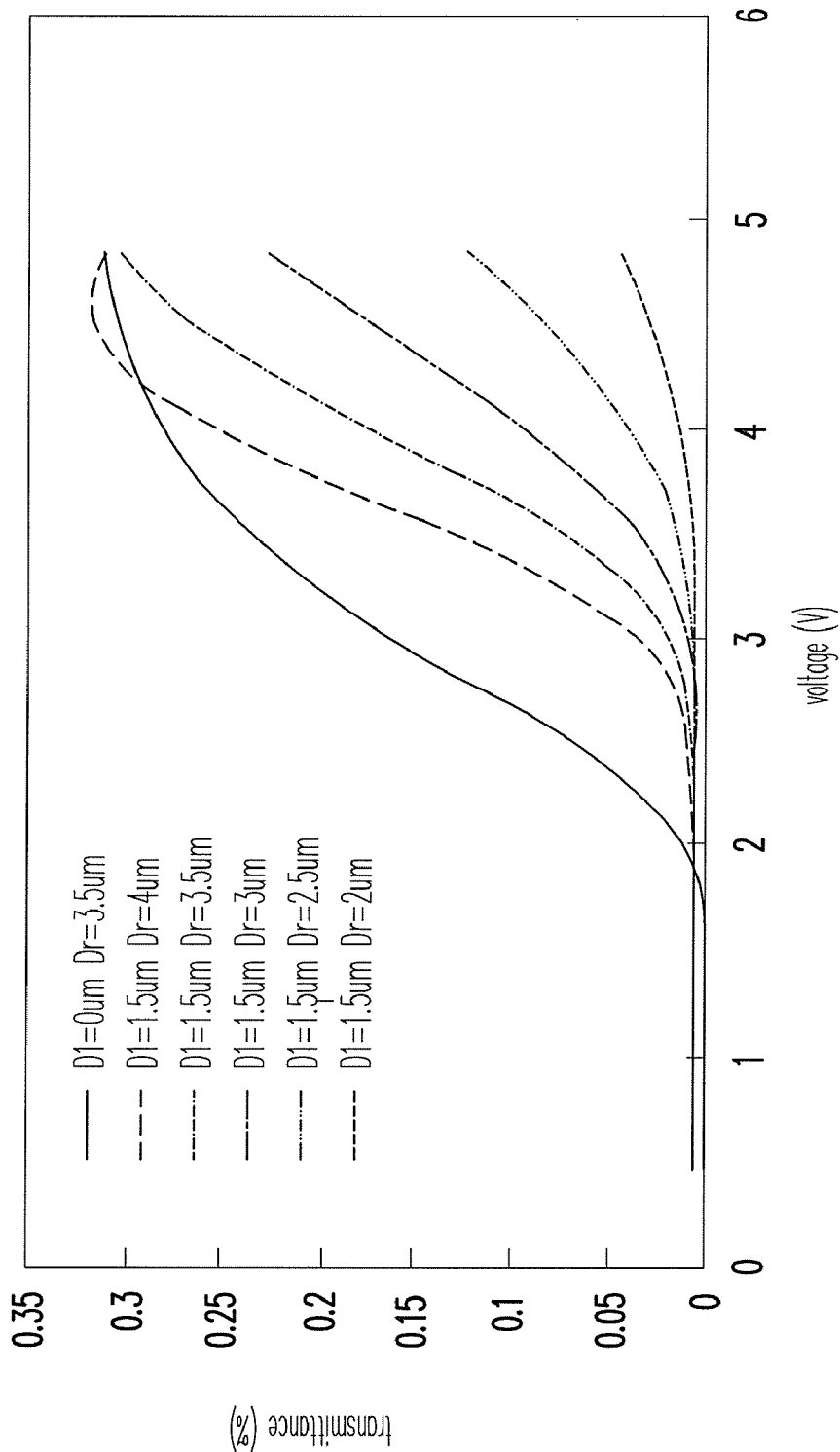

FIG. 10 is a curve diagram of the display panel transmittance versus driving voltage measured in the display panel after using the thickness D1 of the thick adjusting layer and the thickness Dr of the LC layer in the reflective area that are listed in Tables 3.

TABLE 3

| D1/Dr | 0.0% | 37.5% | 42.9% | 50.0% | 60.0% | 75% |
|---|---|---|---|---|---|---|
| D1 (μm) | 0 | 1.5 | 1.5 | 1.5 | 1.5 | 1.5 |
| Dr (μm) | 3.5 | 4 | 3.5 | 3 | 2.5 | 2 |

As illustrated in FIG. 10 and Table 3, when D1/Dr equals to about 37.5% and about 42.9%, the display panel drives the voltage. For example, when the voltage is close to 5V, the suitable or standard transmittance required by design is still present, such as a transmittance substantially greater than 30%.

Figure 11:
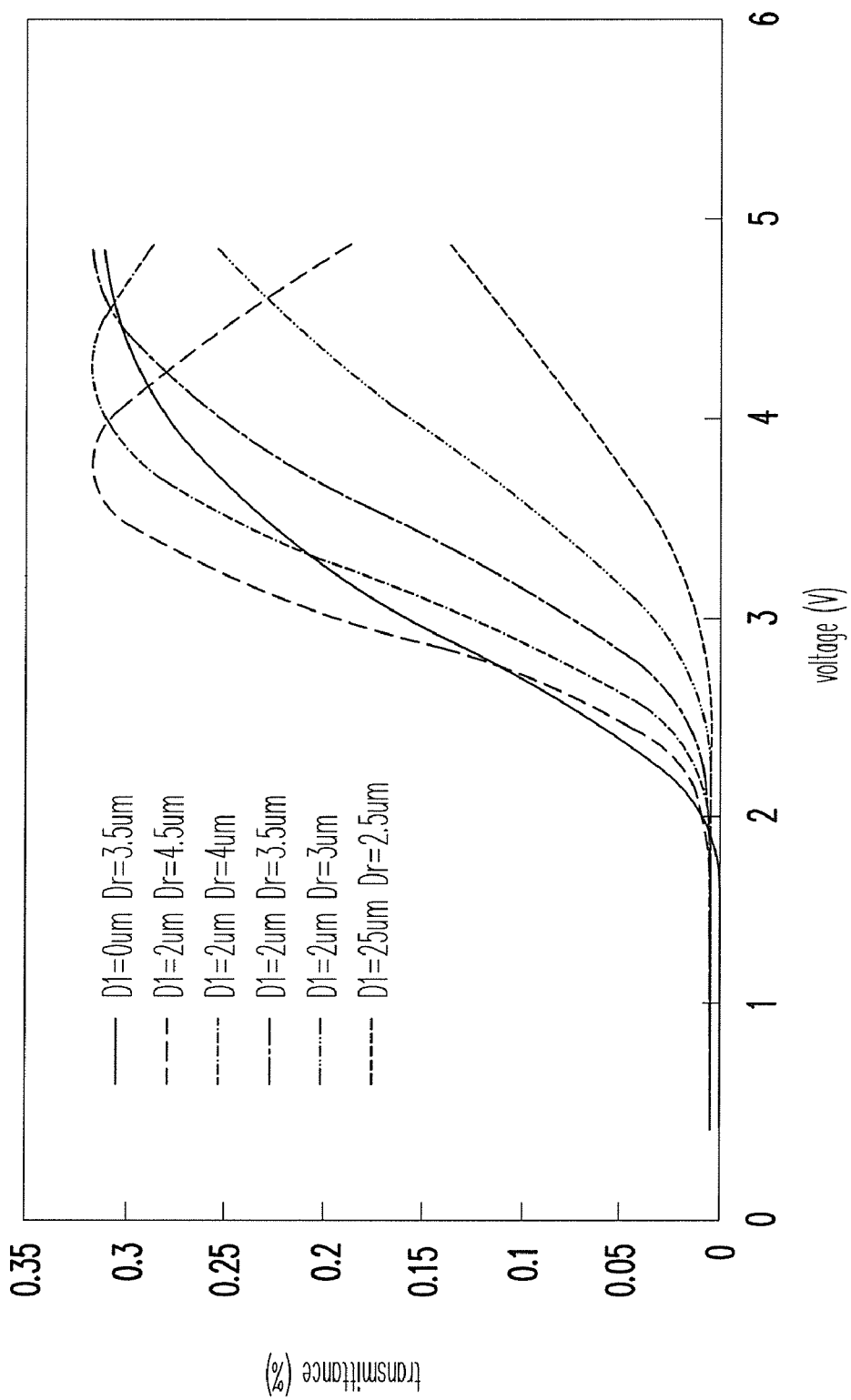

FIG. 11 is a curve diagram of the display panel transmittance versus driving voltage measured in the display panel by using the thickness D1 of the thick adjusting layer and the thickness Dr of the LC layer in the reflective area that are listed in Tables 4.

TABLE 4

| D1/Dr | 0.0% | 44.4% | 50.0% | 57.1% | 66.7% | 80.0% |
|---|---|---|---|---|---|---|
| D1 (μm) | 0 | 2 | 2 | 2 | 2 | 2 |
| Dr (μm) | 3.5 | 4.5 | 4 | 3.5 | 3 | 2.5 |

As illustrated in FIG. 11 and Table 4, when D1/Dr equals to about 44.4% and about 50.0%, the display panel drives the voltage. For example, when the voltage is close to 5V, the suitable or standard transmittance required by design is still present, such as a transmittance substantially greater than 30%.

In light of the foregoing, it is illustrated that D1+Dr is similar to the thickness of the LC layer in the transparent area, that is, the cell-gap. If the cell gap equals to D, then the value of D can be varied according to the demands in design. For instance, in order to accelerate the response time, the D value is decreased. On the contrary, the response time is decelerated. Moreover, the D value is substantially greater than D1 and Dr. Normally, the D value is usually smaller or equal to about 10 μm and greater than 0 μm. The commonly used D value is usually smaller or equal to about 7 μm and greater than 0 μm. The current used D value is usually smaller or equal to about 4 μm and greater than 0 μm. In addition, D1 and Dr are both positive natural numbers that are greater than zero. As D1 substantially increases, Dr substantially decreases. Alternatively, when D1 substantially decreases, Dr substantially increases. However, under certain specific conditions, D1 substantially equals to Dr. Therefore, as shown in FIGS. 8-11 and Tables 1-4, the ratio of D1/Dr is $\geq$ about 15% to $\leq$ about 50% and Dr=A+D1, where A is a positive natural number greater than zero. In the aforementioned embodiment of the present invention, acceptably, about $4.5 \geq A \geq$ about 1. More acceptably, about $3.5 \geq A \geq$ about 1.5, or about $3.5 \geq A \geq$ about 1, or about $3.5 \geq A \geq$ about 2. Preferably, about $3 \geq A \geq$ about 2. More preferably, about $2.5 \geq A \geq$ about 2. The optimum value of A is about 2 or about 2.5, where the display panel can attain the most suitable transmittance under the same voltage. Table 5 is a summary of the data listed in Tables 1-4.

TABLE 5

| | D1(μm) | | | |
|---|---|---|---|---|
| Dr(μm) | 0.5 | 1 | 1.5 | 2 |
| 4.5 | | | | Most suitable |
| 4 | | | Most suitable | Most suitable |

TABLE 5-continued

| Dr(μm) | D1(μm) | | | |
|---|---|---|---|---|
| | 0.5 | 1 | 1.5 | 2 |
| 3.5 | | Most suitable | Most suitable | |
| 3 | Most suitable | Most suitable | | |
| 2.5 | Most suitable | | | |
| 2 | | | | |

Therefore, by cooperating the thickness D1 of the thickness adjusting layer and the cell-gap Dr of the LC layer in the reflective area, the phase retardation of the lights from the front light source or the external light source (ambient light source or environment light source) which are reflected by the reflective area R can be adjusted. Hence, the display quality of the transflective LCD panel is further improved.

Figure 12:
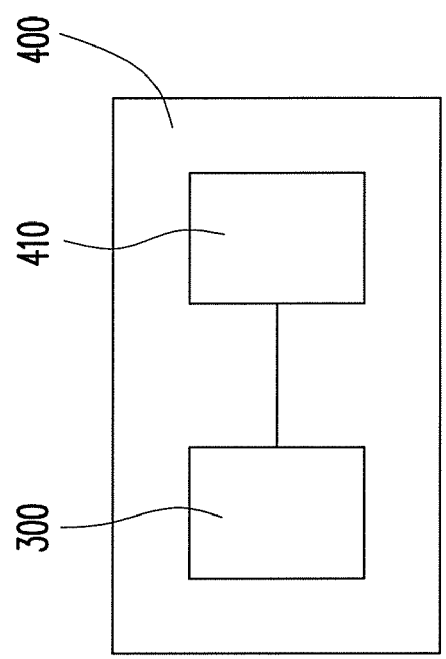
FIG. 12 is a schematic diagram of an electro-optical apparatus according to an embodiment of the present invention.

FIG. 12 is a schematic diagram of an electro-optical apparatus according to an embodiment of the present invention. Referring to FIG. 12, a display panel 300 can be electrically connected with an electronic device 410 to form an electro-optical apparatus 400. In this case, the display panel 300 is one of the display panels 200, 200b, or 200c described in the embodiments aforementioned. A method of manufacturing the display panel 300 includes the above-mentioned methods of manufacturing the display panels 200, 200b, or 200c. Thereafter, a procedure of manufacturing the electro-optical apparatus 400 is followed to obtain the electro-optical apparatus 400. In the present embodiment, as the display panel 300 applies the display panels 200, 200b, or 200c aforementioned, thus, the electro-optical apparatus 400 that applies the display panel 300 can increase the aperture ratio thereof.

Moreover, the electronic device 410 includes a control device, an operating device, a treatment device, an input device, a memory device, a driving device, a light emitting device, a protection device, a sensing device, a detecting device, other devices having other functions, or a combination thereof. The electro-optical apparatus 400 includes a portable product (e.g. a mobile phone, a camcorder, a camera, a laptop computer, a game player, a watch, a music player, an e-mail receiver and sender, a map navigator, a digital picture, or the like), an audio-video product (e.g. an audio-video player or the like), a screen, a television, a bulletin, a panel in a projector, and so on.

In light of the foregoing, in the sub-pixels applied in the display panel of the present invention, the edge of the transparent electrode and the edge of the reflective electrode at the connection part of the transparent electrode and the reflective electrode are entirely covered. Therefore, the connection part does not have the design of main slits. As a consequence, the present invention has a higher aperture ratio in comparison to those of the conventional display panels. It should be noted that the edge of the transparent electrode and the edge of the reflective electrode are entirely covered represents that the entire edge of the transparent electrode covers the entire edge of the reflective electrode in the same sub-pixel, or the entire edge of the reflective electrode covers the entire edge of the transparent electrode in the same sub-pixel. If the manufacturing condition (i.e. the photolithographic and etching process) is well controlled, the entire edge of the transparent electrode then contacts the entire edge of the reflective electrode completely in the same sub-pixel. As a result, no gap is present between the electrodes (transparent and reflective electrodes) in the same sub-pixel, and the foresaid situation is included in the scope of the present invention. In other words, shapes of the transparent electrode and the reflective electrode correspond to shapes of the areas T and R in the same sub-pixel. The width of the transparent electrode and the width of the reflective electrode are contacted completely or covered entirely in the same sub-pixel.

Moreover, the thickness adjusting layer of the present invention covers on the reflective electrode or covers on reflective electrode and extends to the edge of a part of the transparent electrode, which is adjacent to the reflective electrode in the same sub-pixel. The thickness adjusting layer also has the function of having alignment patterns (such as alignment protrusions). Hence, the alignment protrusions do not need to be disposed on the second substrate above the transparent electrode and the reflective electrode in the present invention. As a result, the aperture ratio of the display panel can be increased.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A display panel, comprising:
a first substrate;
a second substrate, disposed above the first substrate and having a transparent electrode layer thereon;
a plurality of signal lines, disposed on the first substrate;
a plurality of sub-pixels, disposed between the first substrate and the second substrate, and electrically connected to the plurality of signal lines, wherein parts of the plurality of sub-pixels have at least one transparent area and at least one reflective area, and the transparent area has a transparent electrode therein while the reflective area has a reflective electrode therein, wherein the edge of the transparent electrode and the edge of the reflective electrode at a connection part of the transparent electrode and the reflective electrode are entirely covered to form a pixel electrode;
at least one common electrode line disposed on the first substrate, wherein the at least one common electrode line is overlapped with an edge of the transparent electrode and an edge of the reflective electrode at the connection part of the transparent electrode and the reflective electrode;
at least one thickness adjusting layer, disposed above the reflective electrode and located within the reflective area of the parts of the sub-pixels; and
a liquid crystal layer, disposed between the first substrate and the second substrate.

2. The display panel of claim 1, wherein the thickness adjusting layer has a thickness D1, the liquid crystal layer located within the reflective area has a thickness Dr, and the ratio of D1/Dr is substantially 15%~50% and Dr=A+D1, wherein A is a positive natural number greater than zero.

3. The display panel of claim 1, wherein the transparent electrode has a plurality of alignment slits.

4. The display panel of claim 1, wherein the second substrate is not disposed with an alignment pattern.

5. The display panel of claim 1, wherein the sub-pixel comprises two transparent areas and one reflective area, and the reflective area is disposed between the two transparent areas.

6. The display panel of claim 5, wherein the transparent electrodes in the two transparent areas each comprises a plurality of first alignment slits and a plurality of second alignment slits, wherein an extending direction of the plurality of first alignment slits is different from an extending direction of the plurality of second alignment slits.

7. The display panel of claim 1, wherein the reflective electrode comprises a plurality of reflective protrusions.

8. The display panel of claim 1, further comprising a color filter matrix disposed on either the first substrate or the second substrate.

9. An electro-optical apparatus comprising the display panel of claim 1.

10. A method of manufacturing a display panel, comprising:
  providing a first substrate;
  providing second substrate, disposed above the first substrate and having a transparent electrode layer thereon;
  disposing a plurality of signal lines on the first substrate;
  providing a plurality of sub-pixels, arranged between the first substrate and the second substrate, wherein the plurality of sub-pixels is electrically connected to the plurality of signal lines, and parts of the plurality of sub-pixels have at least one transparent area and at least one reflective area, and the transparent area has a transparent electrode therein while the reflective area has a reflective electrode therein, wherein the edge of the transparent electrode and the edge of the reflective electrode at a connection part of the transparent electrode and the reflective electrode are entirely covered to form a pixel electrode;
  disposing at least one common electrode line on the first substrate, wherein the at least one common electrode line is overlapped with an edge of the transparent electrode and an edge of the reflective electrode at the connection part of the transparent electrode and the reflective electrode;
  disposing at least one thickness adjusting layer above the reflective electrode and located within the reflective area of the parts of the sub-pixels; and
  disposing a liquid crystal layer between the first substrate and the second substrate.

11. The method of claim 10, wherein the thickness adjusting layer has a thickness $D_1$, the liquid crystal layer located within the reflective area has a thickness $D_r$, and the ratio of $D_1/D_r$ is substantially 15%~50% and $D_r = A + D_1$, wherein A is a positive natural number greater than zero.

12. The method of claim 10, wherein the transparent electrode has a plurality of alignment slits.

13. The method of claim 10, wherein the second substrate is not disposed with an alignment pattern.

14. The method of claim 10, wherein the sub-pixel comprises two transparent areas and one reflective area, and the reflective area is disposed between the two transparent areas.

15. The method of claim 14, wherein the transparent electrodes in the two transparent areas each comprises a plurality of first alignment slits and a plurality of second alignment slits, wherein an extending direction of the plurality of first alignment slits is different from an extending direction of the plurality of second alignment slits.

16. The method of claim 10, wherein the at least one common electrode line is disposed when the plurality of signal lines are disposed on the first substrate.

17. The method of claim 10, wherein the reflective electrode comprises a plurality of reflective protrusions.

18. The method of claim 10, further comprising disposing a color filter matrix on either the first substrate or the second substrate.

19. A method of manufacturing an electro-optical apparatus, comprising the method of the display panel of claim 10.

* * * * *